(12) United States Patent
Lee et al.

(10) Patent No.: US 8,466,920 B2
(45) Date of Patent: Jun. 18, 2013

(54) TWO DIMENSIONAL VECTOR GRAPHICS TRIANGULATION SYSTEM AND METHOD THEREOF

(75) Inventors: Huai-Che Lee, Taipei County (TW); Jung-Hong Chuang, Hsinchu (TW); Tan-Chi Ho, Yunlin County (TW); Tsung-Sheng Fu, Taipei (TW); Yun Chien, Taipei (TW); Chia-Ming Liu, Taipei (TW)

(73) Assignee: Institute for Information Industry, Taipei (TW)

( * ) Notice: Subject to any disclaimer, the term of this patent is extended or adjusted under 35 U.S.C. 154(b) by 865 days.

(21) Appl. No.: 12/631,785

(22) Filed: Dec. 4, 2009

(65) Prior Publication Data

US 2011/0122139 A1    May 26, 2011

(30) Foreign Application Priority Data

Nov. 23, 2009 (TW) ............................... 98139814 A

(51) Int. Cl.
*G06T 11/20* (2006.01)
(52) U.S. Cl.
USPC ......................................................... 345/441
(58) Field of Classification Search
USPC ......................................................... 345/441
See application file for complete search history.

(56) References Cited

U.S. PATENT DOCUMENTS

| | | | | | |
|---|---|---|---|---|---|
| 5,896,139 | A | * | 4/1999 | Strauss | 345/440 |
| 6,046,744 | A | * | 4/2000 | Hoppe | 345/419 |
| 6,137,492 | A | * | 10/2000 | Hoppe | 345/420 |
| 6,798,411 | B1 | * | 9/2004 | Gorman et al. | 345/428 |
| 6,889,176 | B1 | * | 5/2005 | Buttolo et al. | 703/1 |
| 2005/0116950 | A1 | * | 6/2005 | Hoppe | 345/423 |
| 2007/0018988 | A1 | * | 1/2007 | Guthe | 345/441 |
| 2010/0149181 | A1 | * | 6/2010 | Lee et al. | 345/423 |

* cited by examiner

*Primary Examiner* — Aaron M Richer
*Assistant Examiner* — Mohammad H Akhavannik
(74) *Attorney, Agent, or Firm* — Jianq Chyun IP Office

(57) ABSTRACT

A two dimensional (2D) vector graphics triangulation system and a method thereof are provided. The system includes a memory module and a triangle mesh processing module. The memory module temporarily stores a triangle mesh triangulated from a 2D vector graphics into a binary tree data structure. The triangle mesh processing module adjusts the triangle mesh, or re-performs a triangulation processing to a local region of the loop when a state of a loop of the 2D vector graphics is changed. The triangle mesh processing module includes a level of detail unit, which proportionally adjusts an error threshold according to a zoom condition of the loop, updates an error value of each boundary line when the loop is deformed, and splits a boundary line or merges two neighboring boundary lines according to the error values of the boundary lines and the error threshold.

18 Claims, 11 Drawing Sheets

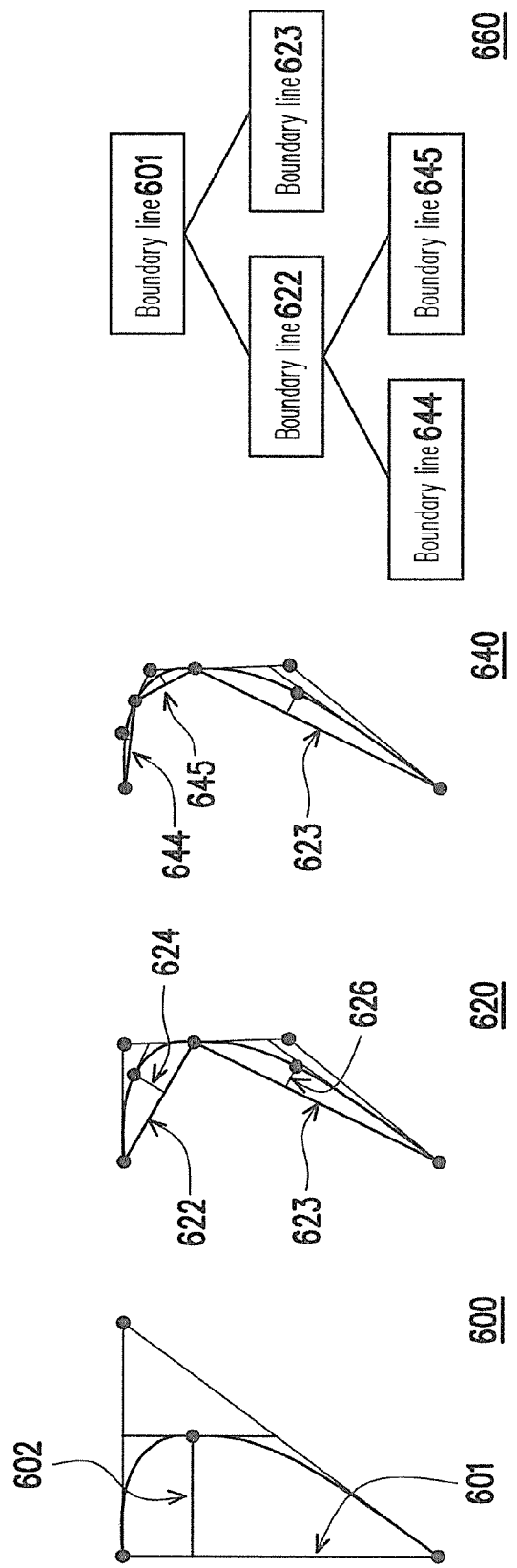

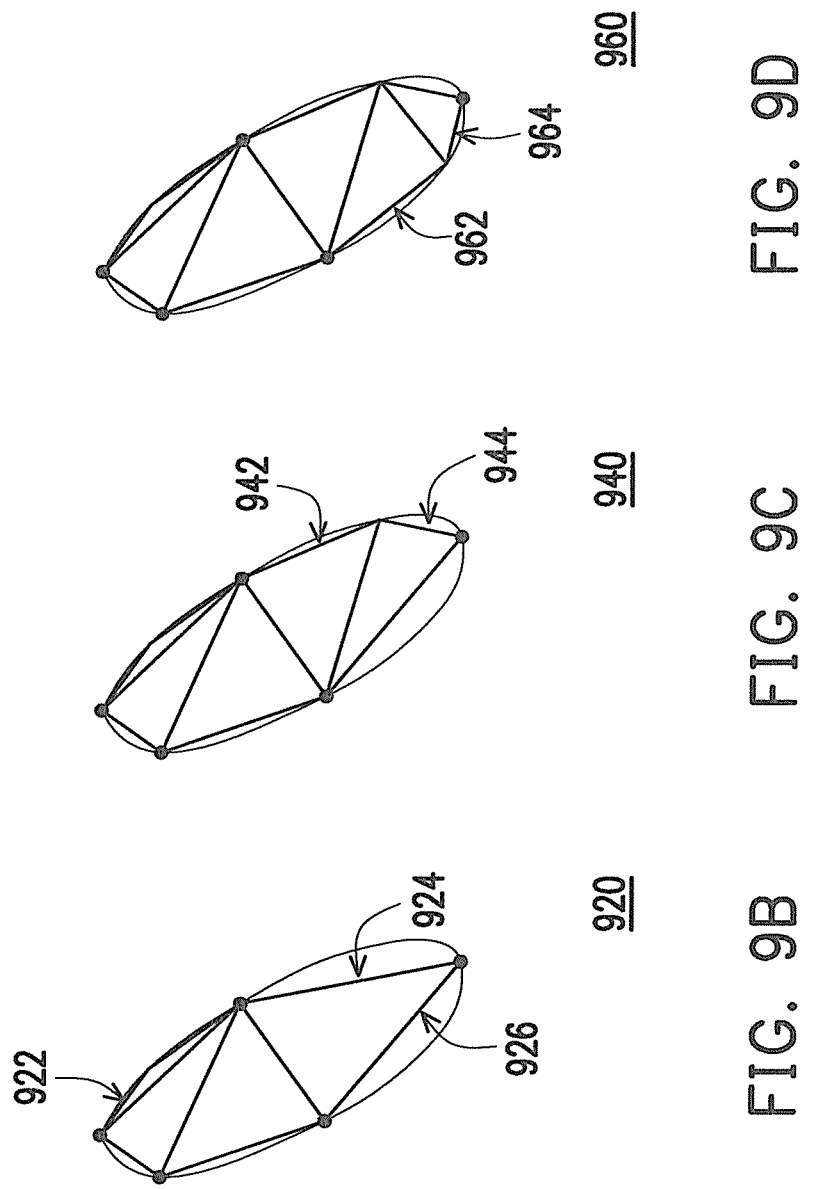

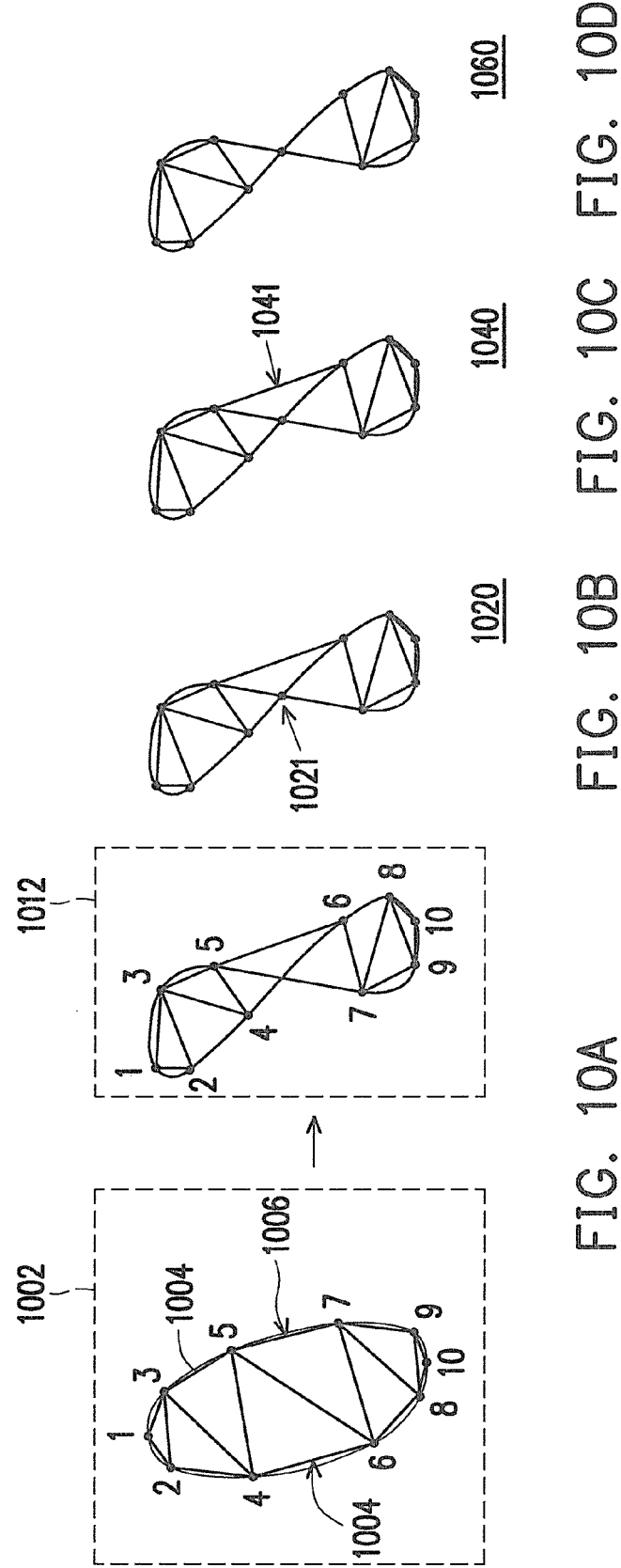

TWO DIMENSIONAL VECTOR GRAPHICS TRIANGULATION SYSTEM AND METHOD THEREOF

CROSS-REFERENCE TO RELATED APPLICATION

This application claims the priority benefit of Taiwan application serial no. 98139814, filed on Nov. 23, 2009. The entirety of the above-mentioned patent application is hereby incorporated by reference herein and made a part of specification.

BACKGROUND OF THE INVENTION

1. Field of the Invention

The present invention generally relates to a two dimensional (2D) vector graphics triangulation system, and more particularly, relates to a 2D vector graphics triangulation system using a dynamic data structure and a method thereof.

2. Description of Related Art

Presently, vector graphics is widely applied in various electronic devices, especially, in handheld devices such as multimedia players, mobile phones, personal digital assistants (PDA), etc. Limited by power consumption and a relatively low computation capability, using the vector graphics overall enhances graphics computing speed and performance. Regarding a drawing processing of the vector graphics, an abstract description is used to represent the graphics to be drawn, so that when the graphics is drawn on a display, the abstract description has to be converted into pixels on the display. In addition to a method of directly computing the pixels, conventionally, the vector graphics is generally converted into a plurality of triangle meshes, and the triangle meshes are drawn by a three-dimensional (3D) hardware-accelerated graphics device.

According to such vector graphics drawing method, a portion of graphics computations are transferred from a central processing unit (CPU) to a graphics processing unit (GPU) having a high efficiency. However, a process of converting the vector graphics description to the triangle meshes (i.e., a triangulation process) involves a plurality of geometric structure adjustments and intersection operations, so that a computing cost thereof is relatively high. When the geometric graphics is zoomed or deformed, repeated triangulation processes results in the required computing cost greater than a benefit of using the GPU. For example, when the geometric graphics is zoomed or deformed, the triangulation process is repeatedly performed to the triangle meshes, so that a great amount of computation resources are consumed, thereby slowing down a drawing process of the vector graphics and causing excessive power consumptions of the electronic device.

SUMMARY OF THE INVENTION

Accordingly, the present invention provides a two dimensional (2D) vector graphics triangulation system and a method thereof, in which a binary tree data structure is used to store triangulated data, and when a 2D vector graphics is zoomed or deformed, triangle meshes are dynamically and regionally adjusted. Accordingly, the 2D vector graphics triangulation system educes times and a range of re-performing a triangulation processing, and reduces corresponding data update operations, thereby lowering overall computing cost and effectively improving a 2D vector graphics processing efficiency.

The present invention provides a 2D vector graphics triangulation system. The 2D vector graphics triangulation system includes a memory module and a triangle mesh processing module. The memory module temporarily stores a triangle mesh generated by performing a triangulation processing to a 2D vector graphics, where the triangle mesh is stored into a binary tree data structure. The triangle mesh processing module is coupled to the memory module, and adjusts the triangle mesh, or re-performs the triangulation processing to a local region of the loop when a state of a loop of the 2D vector graphics is changed. Moreover, the triangle mesh processing module includes a level of detail unit, which proportionally adjusts an error threshold according to a zoom condition when a loop of the 2D vector graphic is deformed. Alternatively, the level of detail unit updates an error value of each boundary line of a loop when the loop of the 2D vector graphics has a deformation condition. Moreover, the level of detail unit splits a boundary line or merges two neighbouring boundary lines according to a comparison result of the error value and the error threshold.

In an exemplary embodiment of the present invention, the 2D vector graphics triangulation system further includes a 2D vector graphics converting module and a triangle mesh drawing module. The 2D vector graphics converting module is coupled to the memory module, and receives an input of the 2D vector graphics, and stores a plurality of curve control point coordinate values of the 2D vector graphics into the binary tree data structure. Moreover, the 2D vector graphics converting module further performs a segmentation processing to the 2D vector graphics to generate one loop or a plurality of loops, and stores data of each loop into the binary tree data structure. Further, the 2D vector graphics converting module further converts each loop of the 2D vector graphics into one triangle mesh or a plurality of triangle meshes through the triangulation processing, and stores data of the triangle mesh or the triangle meshes into the binary tree data structure. In addition, the triangle mesh drawing module draws the triangle mesh according to the binary tree data structure.

In an exemplary embodiment of the present invention, when a loop of the 2D vector graphics has the zoom condition, the level of detail unit does not update a geometric structure characteristic value of each boundary line, and if the zoom condition corresponds to an enlargement, the level of detail unit proportionally enlarges an error threshold corresponding to each of the boundary lines, and if the zoom condition corresponds to a reduction, the level of detail unit proportionally reduces the error threshold corresponding to each of the boundary lines.

In an exemplary embodiment of the present invention, when the level of detail unit determines that an error value of a boundary line is greater than or equal to the error threshold, the level of detail unit splits the boundary line into two new boundary lines, and adds data of the two new boundary lines into the binary tree data structure. Moreover, when the level of detail unit determines that an error value of a common upper-level boundary line of any two neighbouring boundary lines is less than the error threshold, the level of detail unit merges the neighbouring boundary lines to form the common upper-level boundary line, and removes data of the merged neighbouring boundary lines from the binary tree data structure.

In an exemplary embodiment of the present invention, the binary tree data structure includes a path structure of the 2D vector graphics, and the path structure includes input data and a loop list. The input data includes a plurality of geometric structure characteristic values of the path structure, and the loop list includes a plurality of loop structures forming the path structure.

In an exemplary embodiment of the present invention, each of the loop structures of the binary data structure includes a corresponding triangle mesh and a boundary line group. The corresponding triangle mesh includes a plurality of vertices forming the triangle mesh of the 2D vector graphics and a plurality of connection relationships between the vertices. The boundary line group includes a plurality of boundary line structures.

In an exemplary embodiment of the present invention, each of the boundary line structures includes an error value, a plurality of geometric structure characteristic values of a current boundary line, and a pointer pointed to an upper-level boundary line. The error value is an error between the boundary line and the loop.

In an exemplary embodiment of the present invention, the triangle mesh processing module further includes a loop update unit configured for inspecting all of intersections of the path structure and updating the binary tree data structure corresponding to the path structure when the loop of the 2D vector graphics has the deformation condition.

In an exemplary embodiment of the present invention, the triangle mesh processing module further includes a triangle mesh update unit, and when there is a new loop presented in an image of the 2D vector graphics, the triangle mesh update unit re-performs the triangulation processing to a local region of the new loop, so as to establish a new triangle mesh, and update the binary tree data structure.

The present invention provides a 2D vector graphics triangulation method, which includes the following steps. First, a binary tree data structure is used to store one triangle mesh or a plurality of triangle meshes generated by performing a triangulation processing to a 2D vector graphics. Next, when a loop of the 2D vector graphics has a zoom condition, an error threshold is proportionally adjusted according to the zoom condition. Next, when a loop of the 2D vector graphics has a deformation condition, an error value of each boundary line of the loop is updated. Next, a boundary line is split or two neighbouring boundary lines are merged according to a comparison result of the error values of the boundary lines and the error threshold. Moreover, when a state of a loop of the 2D vector graphics is changed, the triangle mesh of the loop is adjusted, or the triangulation processing is re-performed to a local region of the loop.

In an exemplary embodiment of the present invention, the 2D vector graphics triangulation method further includes following steps. First, an input of the 2D vector graphics is received, and a plurality of curve control point coordinate values of the 2D vector graphics is stored into the binary tree data structure. Next, a segmentation processing is performed to the 2D vector graphics to generate one loop or a plurality of loops, and data of each loop is stored into the binary tree data structure. Next, each loop of the 2D vector graphics is converted into one triangle mesh or a plurality of triangle meshes through the triangulation processing, and data of the triangle mesh or the triangle meshes are stored into the binary tree data structure. Next, the triangle mesh is drawn according to the binary tree data structure.

In an exemplary embodiment of the present invention, when a loop of the 2D vector graphics has the zoom condition, a geometric structure characteristic value of each boundary line is not updated, and if the zoom condition corresponds to an enlargement, an error threshold corresponding to each of the boundary lines is proportionally enlarged, and if the zoom condition corresponds to a reduction, the error threshold corresponding to each of the boundary lines is proportionally reduced.

In an exemplary embodiment of the present invention, the step of splitting the boundary line or merging two neighbouring boundary lines according to the comparison result of the error value and the error threshold comprises the following steps. First, when an error value of a boundary line is greater than or equal to the error threshold, the boundary line is split into two new boundary lines, and data of the two new boundary lines are added into the binary tree data structure. Next, when an error value of a common upper-level boundary line of two neighbouring boundary lines is less than the error threshold, the two neighbouring boundary lines are merged into the common upper-level boundary line, and data of the two boundary lines are removed from the binary tree data structure.

According to the above descriptions, the present invention provides the 2D vector graphics triangulation system and the method thereof, in which the binary tree data structure is used to store the triangle mesh generated through the triangulation processing. When the 2D vector graphics is zoomed, by inspecting the error value of each boundary line and the corresponding error threshold, the upper/lower-level boundary line and the error values thereof are updated, so as to dynamically adjust a resolution of the triangle mesh. Moreover, when the 2D vector graphics is deformed, a regional multi-level resolution adjustment is performed to necessary geometric structures in the triangle mesh, or the triangulation processing is re-performed to a necessary region. Therefore, by using the 2D vector graphics triangulation system of the present invention, times and a range of re-performing the triangulation processing can be reduced, and the corresponding resolution adjustment is reduced, thereby reducing overall computing cost.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 6A-6C are schematic diagrams illustrating a process that a level of detail unit splits a boundary line.

FIG. 6D is a schematic diagram illustrating a binary tree data structure corresponding to boundary lines of FIGS. 6A-6C.

FIGS. 9A-9D are schematic diagrams illustrating a situation that a level of detail unit deals with a deformation condition according to an exemplary embodiment of the present invention.

FIGS. 10A-10D are schematic diagrams illustrating operations of a 2D vector graphics triangulation system when a state of a loop is changed according to an exemplary embodiment of the present invention.

DESCRIPTION OF THE EMBODIMENTS

Figure 1:
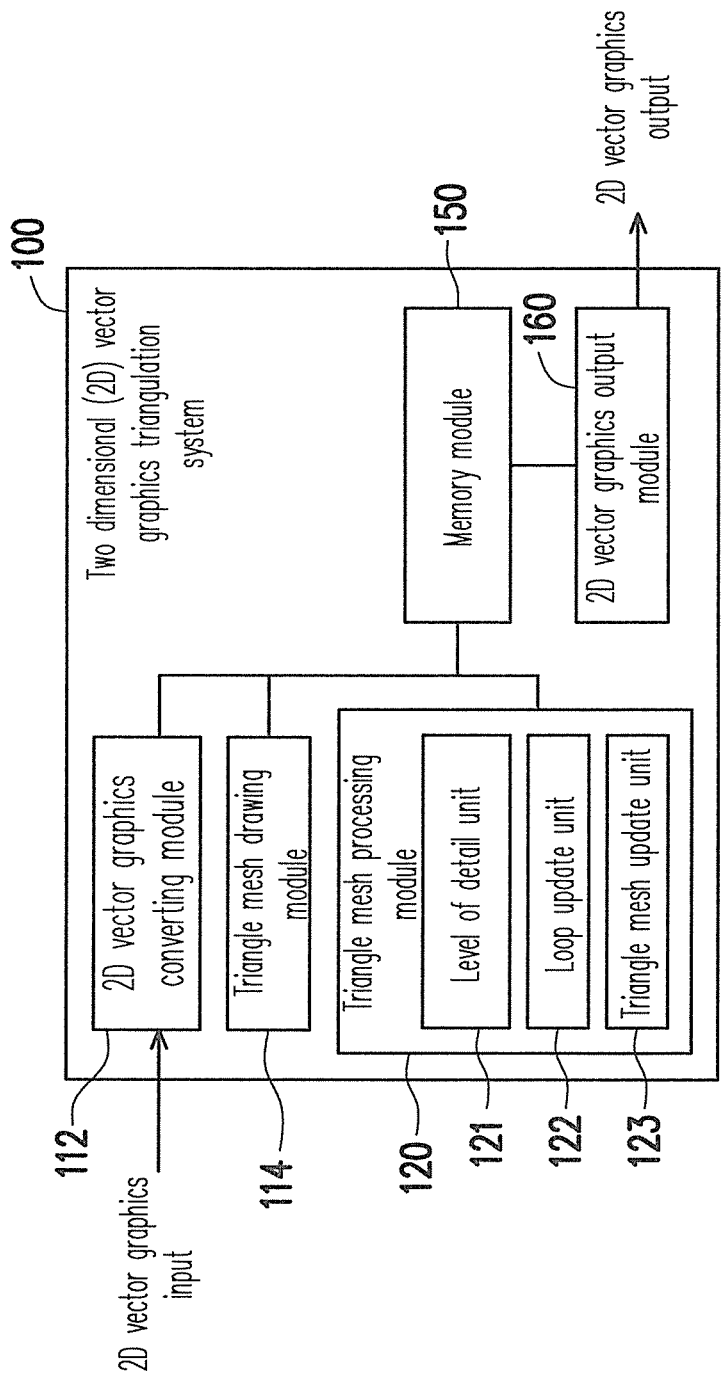
FIG. 1 is a system block diagram illustrating a 2D vector graphics triangulation system according to an exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

According exemplary embodiments of the present invention, the present invention provides a two dimensional (2D) vector graphics triangulation system and a method thereof, in which a binary tree data structure is used to store a triangle mesh generated through a triangulation processing. When a 2D vector graphics is zoomed, by inspecting an error value of each boundary line and a corresponding error threshold, an upper/lower-level boundary line and the error values thereof are updated, so as to dynamically adjust a resolution of the triangle mesh. Moreover, when the 2D vector graphics is deformed, a regional multi-level resolution adjustment is performed to necessary geometric structures in the triangle mesh, or the triangulation processing is re-performed to a necessary region. By such means, the 2D vector graphics triangulation system reduces times and a range of re-performing the triangulation processing, and reduces the corresponding resolution adjustment, thereby reducing overall computing cost. In the following content, the 2D vector graphics triangulation system is introduced in accordance with FIG. 1, the binary tree data structure is introduced in accordance with FIG. 3, and the 2D vector graphics triangulation method are introduced in accordance with FIGS. 4-5.

FIG. 1 is a system block diagram illustrating a 2D vector graphics triangulation system according to an exemplary embodiment of the present invention. Referring to FIG. 1, in the present exemplary embodiment, the 2D vector graphics triangulation system 100 includes a 2D vector graphics converting module 112, a triangle mesh drawing module 114, a triangle mesh processing module 120, a memory module 150 and a 2D vector graphics output module 160. The memory module 150 is configured to temporarily store a triangle mesh generated by performing a triangulation processing to a 2D vector graphics, where the triangle mesh is stored into a binary tree data structure. The 2D vector graphics converting module 112 is connected to the memory module 150, and is configured for receiving an input of the 2D vector graphics, and storing a plurality of curve control point coordinate values of the 2D vector graphics into the binary tree data structure. The triangle mesh drawing module 114 is configured to draw the triangle mesh according to the binary tree data structure. The triangle mesh processing module 120 is coupled to the memory module 150, and is configured to adjust the triangle mesh, or re-perform the triangulation processing to a local region of the loop when a state of a loop of the 2D vector graphics is changed. The 2D vector graphics output module 160 is configured for outputting the binary tree data structure to a graphics processing unit (GPU) or a central processing unit (CPU), so as to present a drawn 2D vector graphics on a display (not shown).

The 2D vector graphics converting module 112 further performs a segmentation processing to the 2D vector graphics to generate one or a plurality of loops, and stores data of each loop into the binary tree data structure. In addition, the 2D vector graphics converting module 112 further converts each loop of the 2D vector graphics into one triangle mesh or a plurality of triangle meshes through the triangulation processing, and stores data of the triangle mesh or the triangle meshes into the binary tree data structure.

Figure 2:
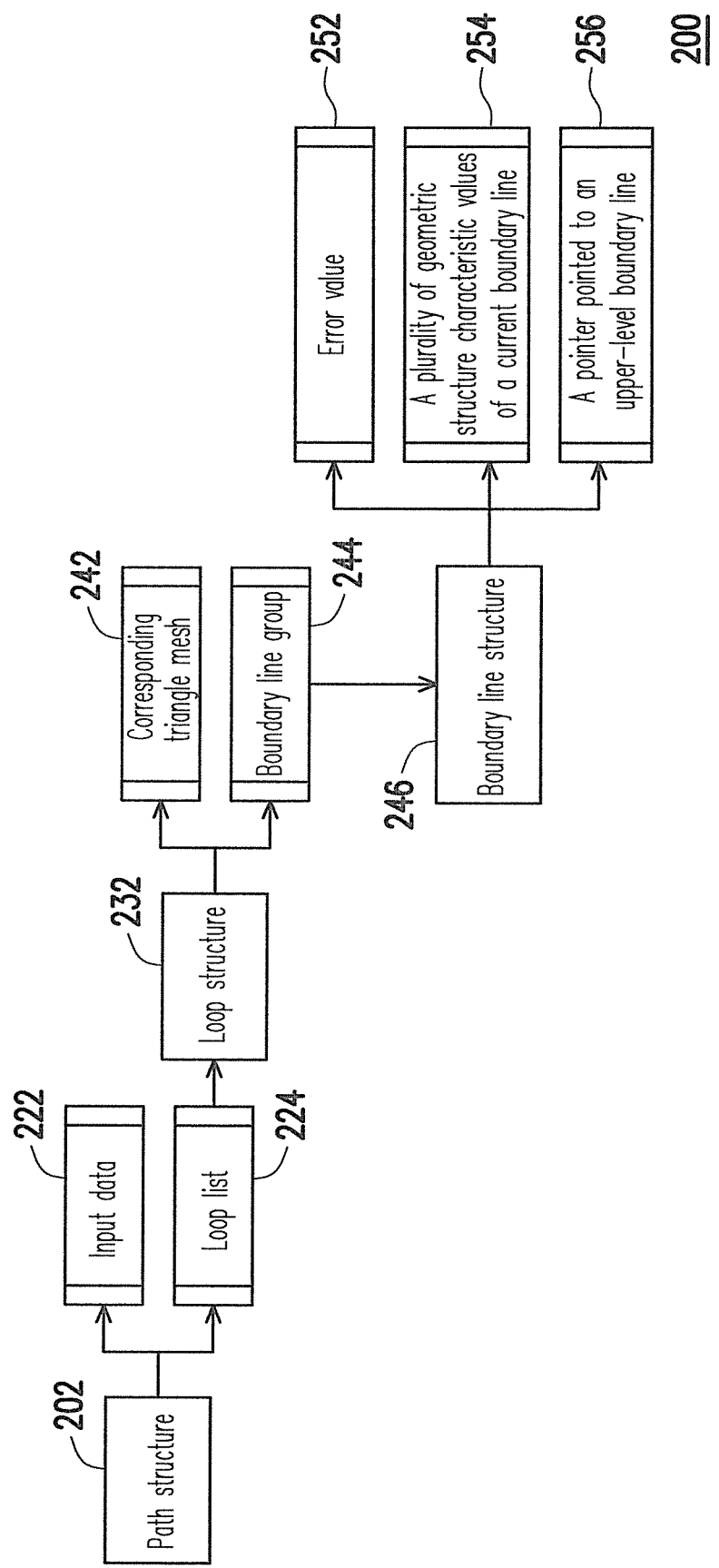
FIG. 2 is a schematic diagram illustrating a binary tree data structure according to an exemplary embodiment of the present invention.

FIG. 2 is a schematic diagram illustrating a binary tree data structure 200 according to an exemplary embodiment of the present invention. The binary tree data structure 200 includes a path structure 202 of the 2D vector graphics, and the path structure 202 includes input data 222 and a loop list 224. The input data 222 includes a plurality of geometric structure characteristic values of the path structure 202, and the loop list includes a plurality of loop structures 232 forming the path structure 202. In the present embodiment, each of the geometric structure characteristic values of the input data 222 includes a start control point coordinate value, an end control point coordinate value and a middle control point coordinate value of one of a plurality of curves for forming the path structure 202. In another exemplary embodiment of the present invention, each of the geometric structure characteristic values of the input data 222 includes a short axis length, a long axis length, a start angle, an end angle and a rotation angle of one of a plurality of arcs for forming the path structure 202. In the other exemplary embodiments of the present invention, each of the geometric structure characteristic values of the input data 222 further includes two control point coordinate values of one of a plurality of straight lines for forming the path structure 202.

Referring to FIG. 2, each of the loop structures 232 of the binary data structure 200 includes a corresponding triangle mesh 242 and a boundary line group 244. The corresponding triangle mesh 242 includes a plurality of vertices forming the triangle mesh of the 2D vector graphics and a plurality of connection relationships between the vertices. The boundary line group 244 includes a plurality of boundary line structures 246. Each of the boundary line structures 246 includes an error value 252, a plurality of geometric structure characteristic values 254 of a current boundary line, and a pointer 256 pointed to an upper-level boundary line. The error value 252 is an error between the boundary line and the loop. In the present embodiment, each of the geometric structure characteristic values 254 in the boundary line structure 246 includes a start control point coordinate value, an end control point coordinate value and a middle control point coordinate value of a curve for forming the boundary line. In another exemplary embodiment of the present invention, each of the geometric structure characteristic values 254 of the boundary line structure 246 further includes a start angle, an end angle and a rotation angle of an arc for forming the boundary line. In the other exemplary embodiments of the present invention, each of the geometric structure characteristic values 254 of the boundary line structure 246 further includes two control point coordinate values of a straight line for forming the boundary line.

Referring to FIG. 1 again, the triangle mesh processing module 120 includes a level of detail unit 121, a loop update unit 122 and a triangle mesh update unit 123. When a loop of the 2D vector graphics is deformed, the loop update unit 122 is configured to inspect all of intersections of the path structure, and updates the binary tree data structure corresponding to the path structure. When a loop of the 2D vector graphic is zoomed, the level of detail unit 121 is configured to proportionally adjust an error threshold according to a zoom condition of the loop. Alternatively, when a loop of the 2D vector graphics is deformed, the level of detail unit 121 updates an error value of each boundary line of the loop. Moreover, the level of detail unit 121 splits a boundary line or merges two neighbouring boundary lines according to a comparison result of the error value and the error threshold. It should be noticed that in the present embodiment, the error threshold is set as a width of a pixel of a display image since human eyes cannot recognize a difference between a straight line and a curve under such level of detail. However, the present invention is not limited thereto, and in the other exemplary embodiments, according to an actual requirement of the level of detail, other parameters can be selected to serve as the error threshold. Regarding the triangle mesh update unit 123, when there is a new loop presented in an image of the 2D vector graphics, the triangle mesh update unit 123 re-performs the triangulation processing to a local region of the new loop, so as to establish a new triangle mesh, and update the binary tree data structure.

In the present embodiment, when a loop of the 2D vector graphics is zoomed, the level of detail unit 121 does not update the geometric structure characteristic value of each boundary line. If the zoom condition corresponds to an enlargement (or a scale-up), the level of detail unit 121 proportionally enlarges an error threshold corresponding to each of the boundary lines, and if the zoom condition corresponds to a reduction (or a scale-down), the level of detail unit 121 proportionally reduces the error threshold corresponding to each of the boundary lines. Moreover, when the level of detail unit 121 determines that an error value of a boundary line is greater than or equal to the error threshold, the level of detail unit 121 splits the boundary line into two new boundary lines, and adds data of the two new boundary lines into the binary tree data structure. Moreover, when the level of detail unit 121 determines that an error value of a common upper-level boundary line of any two neighbouring boundary lines is less than the error threshold, the level of detail unit 121 merges the two neighbouring boundary lines to form the common upper-level boundary line, and removes data of the two merged neighbouring boundary lines from the binary tree data structure.

In the present embodiment, the loop update unit 122 further detects whether the loop is folded by measuring a direction change of a normal vector of a triangle. Assuming a triangle mesh includes a plurality of triangles, each of the triangles is formed by three neighbouring boundary lines, and a normal vector of each triangle is perpendicular to a plane formed by the corresponding triangle. Conventionally, when the control points of a triangle are serially connected anticlockwise, a normal vector of the triangle is perpendicular to a plane formed by three control points serially connected anticlockwise. However, the above detection is not limited to the conventional definition of the normal vector of the triangle, and as long as the direction change of the normal vector of the triangle can be determined, it can be used to determine whether the loop is folded.

After the loop update unit 122 detects a folding condition of the loop, it further inspects an intersecting condition between a folded triangle and a boundary line to determine an influence range of such deformation for the loop. Moreover, when the deformation causes a self-intersecting state of the path structure, the loop update unit 122 determines whether a loop is generated or disappeared by inspecting a variation of a total number of the intersections of the path structure.

When the deformation causes any two path structures overlapped, the loop update unit 122 obtains a new generated loop by inspecting a plurality of intersections of the overlapped path structures. Then, the loop update unit 122 updates the binary tree data structures of a plurality of loops of the path structures according to a dependence relationship (corresponding to the binary tree data structures) of the two boundary lines. When the deformation causes internal overlapping of any of the loops, the loop update unit 122 obtains an overlapped loop of the internal overlapping of the loop, and removes the overlapped loop and updates the binary tree data structure of the loop.

In the present embodiment, when a state of a loop of the 2D vector graphics is changed, the triangle mesh update unit 122 updates the loop, and updates the triangle mesh corresponding to the updated loop. The triangle mesh update unit 122 splits two intersected boundary lines into four boundary lines, and adds a new intersection. Then, the triangle mesh update unit 122 merges two other originally separated neighbouring boundary lines, and removes an old intersection. Moreover, the triangle mesh update unit 122 adjusts a plurality of the vertices and the connection relationship between the vertices that are influenced during a process of adding the new intersection and removing the old intersection, and updates the binary tree data structure of the loop.

After the main components of the 2D vector graphics triangulation system 100 and operation methods thereof are introduced, a 2D vector graphics triangulation method is introduced below with reference to FIG. 3 and FIG. 4.

Figure 3:
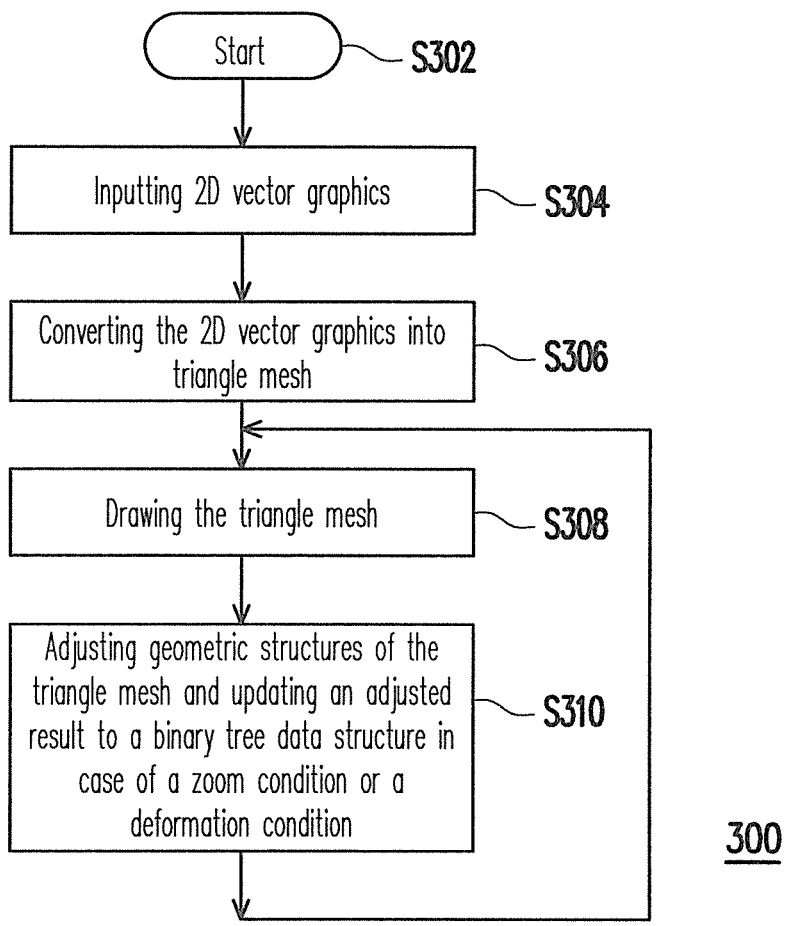
FIG. 3 is a flowchart illustrating a 2D vector graphics triangulation method according to an exemplary embodiment of the present invention.

FIG. 3 is a flowchart illustrating a 2D vector graphics triangulation method 300 according to an exemplary embodiment of the present invention. Referring to FIG. 1 and FIG. 3, in the present embodiment, the 2D vector graphics triangulation method 300 is starts from a step S302 and continues step S304. Next, in the step S304, an input of the 2D vector graphics is received. After the step S304, step S306 is executed. In the step S306, the 2D vector graphics is triangulated into a triangle mesh. After the step S306, step S308 is executed. In the step S308, the triangle mesh is drawn. After the step S308, step S310 is executed. In the step S310, when the loop of the 2D vector graphics is zoomed or deformed, a geometric structure of the triangle mesh is adjusted, and an adjustment result thereof is updated to the binary tree data structure. After the step S308, the step S308 is repeated. This means that the 2D vector graphics triangulation method 300 is continually repeated between the steps S308 and S310 until the 2D vector graphics is no longer changed. In the present embodiment, the 2D vector graphics output module 160 outputs the binary tree data structure to the GPU or the CPU in the step S310, so as to present the drawn 2D vector graphics on a display.

Figure 4:
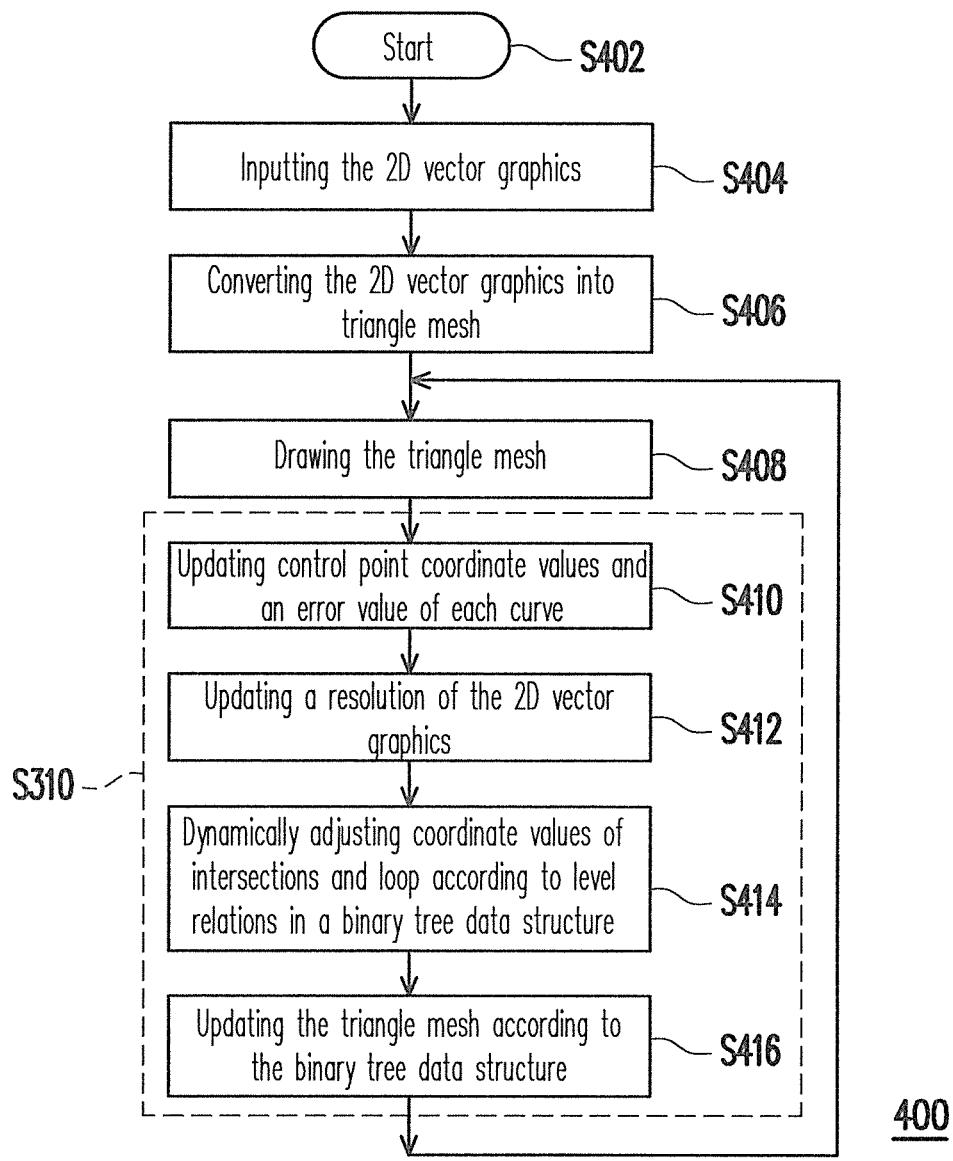
FIG. 4 is a flowchart illustrating another 2D vector graphics triangulation method according to another exemplary embodiment of the present invention.

FIG. 4 is a flowchart illustrating another 2D vector graphics triangulation method 400 according to another exemplary embodiment of the present invention. In the present embodiment, steps S402 to S408 are similar to the steps S302 to S308 of the 2D vector graphics triangulation method 300, so that detailed descriptions thereof are not repeated. In the present embodiment, the step S310 of the 2D vector graphics triangulation method 300 is replaced by steps S410 to S416. After the step S408, step S410 is executed. In detail, in the step S410, control point coordinate values and an error value of each curve are updated. After the step S410, step S412 is executed. In the step S412, a resolution of the 2D vector graphics is updated. After the step S412, step S414 is executed. In the step S414, coordinate values of the intersections and the loop are dynamically adjusted according to level relationships in the binary tree data structure. After the step S414, step S416 is executed. In the step S416, the triangle mesh is updated according to the binary tree data structure. After the step S416, the step S408 is repeated. This means that the 2D vector graphics triangulation method 400 is continually repeated between the steps S408 and S416 until the 2D vector graphics is no longer changed. In the present embodiment, the 2D vector graphics output module 160 outputs the binary tree data structure to the GPU or the CPU in the step S416, so as to present the drawn 2D vector graphics on a display.

After the 2D vector graphics triangulation methods 300 and 400 are introduced, detail operation principles of the 2D vector graphics converting module 112, the triangle mesh processing module 120 and the level of detail unit 121 are introduced below with reference to FIG. 5.

Figure 5:
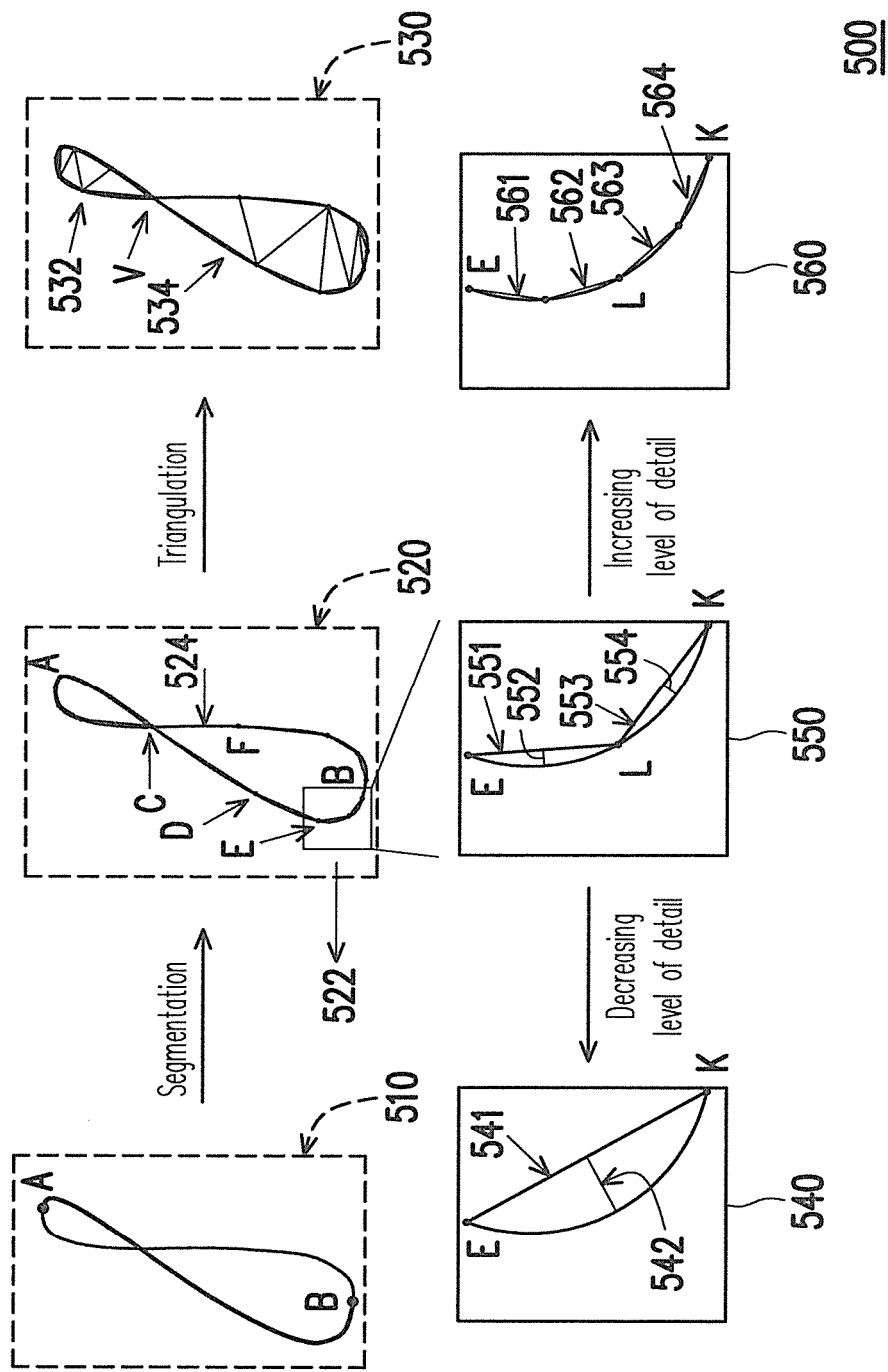
FIG. 5 is a schematic diagram illustrating a 2D vector graphics converting method according to an exemplary embodiment of the present invention.

FIG. 5 is a schematic diagram illustrating a 2D vector graphics converting method according to an exemplary embodiment of the present invention. A path 510 represents an input stage of the 2D vector graphics, which includes two curves. A curve 1 and a curve 2 are respectively two different curves of the path 510 from a vertex A to a vertex B, and the curves 1 and 2 are combined to form the path 510, though the present invention is not limited thereto, and one path can include more than two curves. The 2D vector graphics converting module 112 performs a segmentation processing to the path 510 to generate a loop 1 and a loop 2 of a 2D vector graphics 520. The loop 1 is a closed curve above a control point C in the 2D vector graphics 520, and the loop 2 is another closed curve below the control point C in the 2D vector graphics 520. During the segmentation processing, the 2D vector graphics converting module 112 selects vertices (for example, the vertices A, B, C, D, E, and F, etc.) of the 2D vector graphics 520. For example, a boundary line 524 is located between the vertices A and B, and the loops 1 and 2 are respectively formed by a plurality of boundary lines similar to the boundary line 524. Then, the 2D vector graphics converting module 112 performs the triangulation processing to the 2D vector graphics 520 to generate a triangle mesh structure 530, namely, the loop 1 and the loop 2 are respectively triangulated into a triangle mesh 532 and a triangle mesh 534. The triangle mesh 532 is located above a control point V, and the triangle mesh 534 is located below the control point V.

Referring to FIG. 5 again, the level of detail unit 121 further adjusts a level of detail of each of the boundary lines of the triangle mesh 532. A block 522 of the 2D vector graphics 520 is amplified to form an amplified block 550. The amplified block 550 includes vertices E, L, and K, where a boundary line 551 between the vertices E and L has an error value 552. The error value 552 is an error between a curved formed between the vertices E and L and the corresponding boundary line 551. Similarly, a boundary line 553 between the vertices L and K has an error value 554, and the error value 554 is an error between a curve formed between the vertices L and K and the corresponding boundary line 553. As described above, the boundary line 551, the error value 552, the boundary line 553 and the error value 554 are all stored in the binary tree data structure. Moreover, the boundary line 551 and the boundary line 553 are two neighbouring boundary lines obtained through the level of detail unit 121 by splitting a boundary line 541 in an amplified block 540. In the binary tree data structure, the boundary line 551 and the boundary line 553 are lower-level boundary lines of the boundary line 541. When the level of detail unit 121 determines that an error value 542 of the boundary line 541 is less than the error threshold, the level of detail unit 121 merges the boundary lines 551 and 553 into the boundary line 541 (i.e., the level of detail is decreased). Conversely, when the level of detail unit 121 determines that the error value 552 of the boundary line 551 is greater than or equal to the error threshold, the level of detail unit 121 splits the boundary line 551 into boundary lines 561 and 562 of an amplified block 560 (i.e., the level of detail is increased). Similarly, when the level of detail unit 121 determines that the error value 554 of the boundary line 553 is greater than or equal to the error threshold, the level of detail unit 121 splits the boundary line 553 into boundary lines 563 and 564 of the amplified block 560.

After the detailed operation principle of the level of detail unit 121 is introduced, detailed operations of the level of detail unit 121 and operations corresponding to the binary tree data structure are introduced below with reference to FIGS. 6A-6C.

FIGS. 6A-6C are schematic diagrams illustrating a process that a level of detail unit splits a boundary line. Referring to FIG. 6A, a boundary line 601 has an error value 602. When the level of detail unit 121 determines that the error value 602 of the boundary line 601 of a block 600 is greater than or equal to the error threshold, the level of detail unit 121 splits the boundary line 601 into boundary lines 622 and 623 in a block 620 shown in FIG. 6B. Referring to FIG. 6D, FIG. 6D is a schematic diagram illustrating a binary tree data structure 660 corresponding to the boundary lines of FIGS. 6A-6C. When the level of detail unit 121 splits the boundary line 601 into the boundary lines 622 and 623, in the binary tree data structure 660, the level of detail unit 121 adds two data structure nodes (which are respectively the boundary line 622 and the boundary line 623) in a lower level of the boundary line 601. The binary tree data structures of the boundary lines 622 and 623 respectively stores corresponding error values 624 and 626, and a pointer pointed to the upper-level boundary line 601. When the level of detail unit 121 continually determines that the error value 624 of the boundary line 622 in the block 620 is greater than or equal to the error threshold, the level of detail unit 121 further splits the boundary line 622 into boundary lines 644 and 645 in a block 640 shown in FIG. 6C, and adds two data structure nodes (which are respectively the boundary line 644 and the boundary line 645) in a lower level of the binary tree data structure of the boundary line 622. As described above, when an image of the 2D vector graphics is zoomed or deformed, the level of detail unit 121 inspects the error value of each level, and when the error value 624 of the boundary line 622 is determined to be less than the error threshold, the level of detail unit 121 merges the boundary lines 644 and 645 into the boundary line 622 (i.e. the level of detail is decreased), and removes the lower-level data structure nodes of the boundary line 622 from the binary data structure.

It should be noticed that the level of detail unit 121 performs the above steps when the 2D vector graphics is initially triangulated (i.e., in an initial stage), and meanwhile the level of detail unit 121 also performs the above steps when the image of the 2D vector graphics is zoomed or deformed. After the operations to the corresponding binary tree data structure performed by the level of detail unit 121 are introduced, an operation principle of the triangle mesh update unit 123 is introduced below with reference to FIGS. 7A-7D.

Figure 7B:
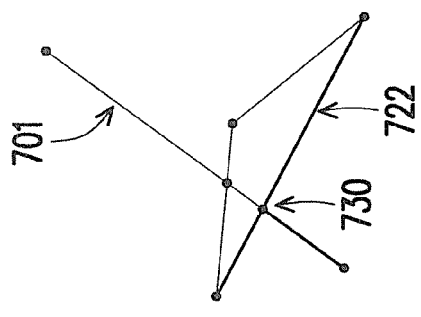
FIGS. 7A-7D are schematic diagrams illustrating detailed operations of a triangle mesh update module.
Figure 7D:
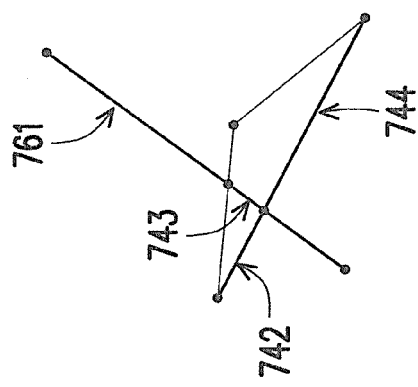
Figure 7A:
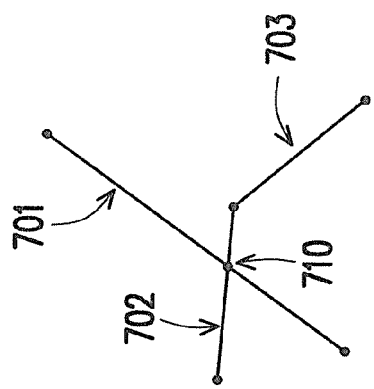
Figure 7C:
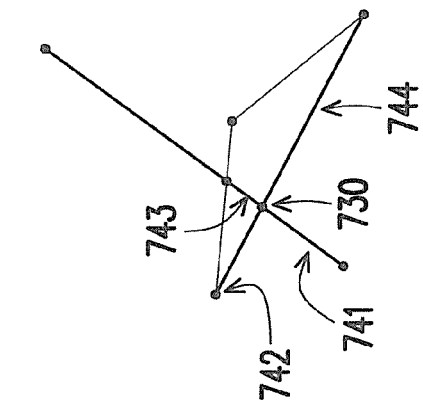

FIGS. 7A-7D are schematic diagrams illustrating detailed operations of the triangle mesh update module 123. Referring to FIG. 7A, when data of a loop formed by boundary lines 702 and 703 of FIG. 7A are varied, an old intersection 710 of the boundary lines 701 and 702 should be deleted, though the old intersection 710 and a new intersection 730 on the corresponding boundary line 701 are not yet updated to the binary tree data structure. Therefore, referring to FIG. 7C, the triangle mesh update module 123 first splits the neighbouring boundary line 702 of the new intersection 730 into new boundary lines 741, 742, 743 and 744. Then, referring to FIG. 7D, the triangle mesh update module 123 further merges a plurality of the neighbouring new boundary lines of the new intersection 730 into new boundary lines 761 and 743, and merges the new boundary lines 743 and 744. After the detailed operations of the triangle mesh update module 123 are introduced, an operation principle that the level of detail unit 121 deals with the zoom condition is introduced below with reference to FIGS. 8A-8C.

Figure 8C:
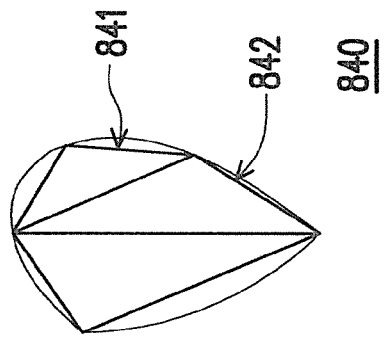
FIGS. 8A-8C are schematic diagrams illustrating a situation that a level of detail unit deals with a zoom condition according to an exemplary embodiment of the present invention.
Figure 8B:
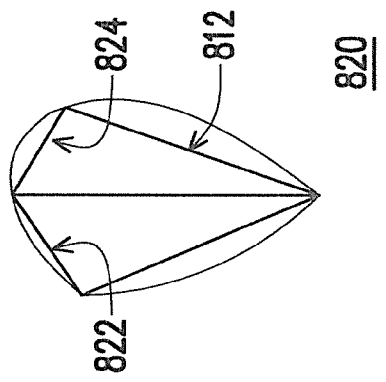
Figure 8A:
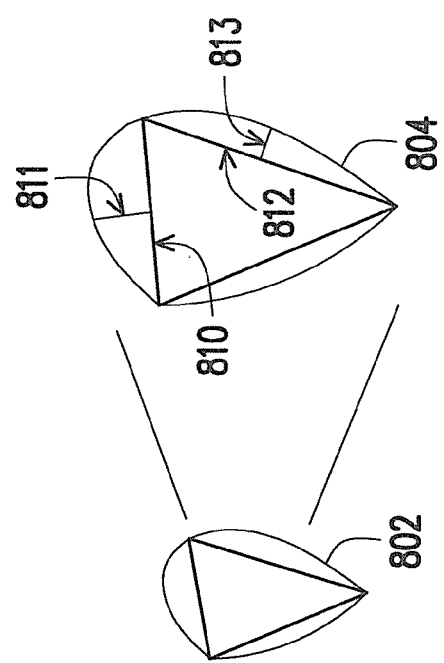
Figure 9A:
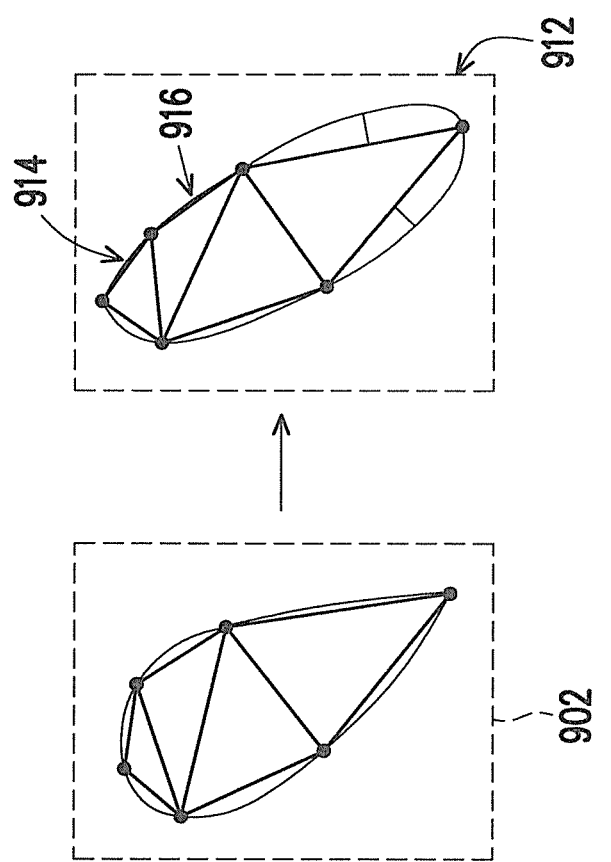

FIGS. 8A-8C are schematic diagrams illustrating a situation that the level of detail unit 121 deals with a zoom condition according to an exemplary embodiment of the present invention. When a loop is enlarged, an error value between a boundary line and a corresponding actual curve is accordingly increased, so that the boundary line having the excessive error value is split into two boundary lines, and information of the related triangle meshes and the boundary lines are updated to the binary tree data structure. For example, referring to FIG. 8A, an inverted water drop-shaped loop 802 is enlarged to form a loop 804, where a shape and relative positions of vertices of the loop 804 are the same to that of the loop 802. However, an error value 811 of a boundary line 810 and an error value 813 of a boundary line 812 are all increased. The level of detail unit 121 determines that the error value 811 is greater than the error threshold, and splits the boundary line 810 into boundary lines 822 and 824 of a loop 820 shown in FIG. 8B. Now, error values (not shown) of the boundary lines 822 and 824 are respectively less than the error threshold, so that the level of detail unit 121 stops further splitting the boundary lines 822 and 824. Similarly, the level of detail unit 121 determines that the error value 813 is greater than the error threshold, and splits the boundary line 812 into boundary lines 841 and 842 shown in FIG. 8C. Now, error values (not shown) of the boundary lines 841 and 842 are respectively less than the error threshold, so that the level of detail unit 121 stops further splitting the boundary lines 841 and 842. By such means, before the enlargement, the triangle mesh of the original loop 802 only has one triangle, while after the enlargement and after the determination and splitting performed by the level of detail unit 121, the triangle mesh of the loop 840 have three triangles.

FIGS. 9A-9D are schematic diagrams illustrating a situation that the level of detail unit 121 deals with a deformation condition according to an exemplary embodiment of the present invention. When control points of a loop are varied, a curvature of an actual curve is accordingly varied, so that an error value between a boundary line and the corresponding actual curve is changed. When the error value of the boundary line is greater than or equal to the error threshold, or when an error value of an upper-level boundary line is less than the error threshold, the boundary lines can be split or merged, and information of the related triangle meshes is updated to the binary tree data structure. For example, referring to FIG. 9A, an inverted water drop-shaped loop 902 is deformed into a loop 912, and a shape thereof is changed to a water drop shape, and relative positions of vertices are also changed. Moreover, some of error values of the boundary lines are increased, and some of error values of the boundary lines are reduced. The level of detail unit 121 determines that an error value 811 of an upper-level boundary line (not shown) of boundary lines 914 and 916 is less than the error threshold, so that the level of detail unit 121 merges the boundary lines 914 and 916 into a boundary line 922 of a loop 920 shown in FIG. 9B. Now, error values (not shown) of boundary lines 924 and 926 are respectively greater than the error threshold, so that the level of detail unit 121 further splits the boundary line 924 and the boundary line 926. The level of detail unit 121 splits the boundary line 924 into boundary lines 942 and 944 of a loop 940 shown in FIG. 9C. Now, error values (not shown) of the boundary lines 942 and 944 are respectively less than the error threshold, so that the level of detail unit 121 stops further splitting the boundary lines 942 and 944. Similarly, the level of detail unit 121 splits the boundary line 926 into boundary lines 962 and 964 of a loop 960 shown in FIG. 9D. By such means, before the deformation, the triangle mesh of the original loop 902 only have four triangles, while after the deformation and after the determination and splitting performed by the level of detail unit 121, the triangle mesh of the loop 960 have five triangles.

FIGS. 10A-10D are schematic diagrams illustrating operations of the 2D vector graphics triangulation system 100 when a state of a loop is changed according to an exemplary embodiment of the present invention. Referring to FIG. 10A, a lower part of a loop 1002 is folded to form a loop 1012, so that a new intersection (a new intersection 1021 of a loop 1020 shown in FIG. 10B) is generated between a boundary line 1004 (formed between control points 4 and 6) and a boundary line 1006 (formed between control points 5 and 7). Assuming the boundary line 1004 (between the control points 4 and 6) and the boundary line 1006 (between the control points 5 and 7) are split according to a position of the new intersection 1021, the loop is divided into two boundary lines. Since the boundary lines are mutually independent, an error connection relationship is created in the original boundary line 1006 between the control points 5 and 7 so that a merging processing is required to be performed so as to remove a boundary line 1041 of a loop 1040 shown in FIG. 10C. Since the lower part of the loop 1040 of FIG. 10C is generated by folding the loop 1002, the triangulation processing has to be re-performed to generate a new triangle mesh, so as to form the triangle mesh 1060 shown in FIG. 10D.

According to an experiment result, when the 2D vector graphics triangulation system 100 and the method thereof are used to continually perform the zoom operations, time required for internal operations of a computer can be greatly reduced. Regarding a test environment, assuming an Intel Core2Duo CPU E6750 (a clock thereof is 2.66 GHz) and an NVIDIA GeForce GPU GTX 260 are used to continually perform the zoom operations. According to a conventional triangulation method, the segmentation processing and the triangulation processing are repeatedly performed, so that a maximum processing time of each frame is 1541 µs and a minimum processing time of each frame is 729 µs. Under the same test environment, the 2D vector graphics triangulation system 100 just uses the level of detail unit 121 to accomplish the zoom operation, and re-performing of the triangulation processing is not required, so that a maximum processing time of each frame is 90 µs, and a minimum processing time of each frame is 15 µs. In other words, compared to the conventional triangulation system and the method thereof, an average efficiency of the 2D vector graphics triangulation system 100 and the method thereof is increased up to about 29.6 times.

In summary, the present invention provides a 2D vector graphics triangulation system and a method thereof. The 2D vector graphics triangulation system uses a binary tree data structure to store the triangle mesh generated through the triangulation processing. When the 2D vector graphics is zoomed, by inspecting the error value of each boundary line and the corresponding error threshold, the upper/lower-level boundary line and the error value thereof are updated, so as to dynamically adjust a resolution of the triangle mesh. Moreover, when the 2D vector graphics is deformed, a regional multi-level resolution adjustment is performed to necessary geometric structures in the triangle mesh, or the triangulation processing is re-performed to a necessary region. Therefore, by using the 2D vector graphics triangulation system of the present invention, times and a range of re-performing the triangulation processing can be reduced, and the corresponding resolution adjustment is reduced, thereby reducing overall computing cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A two dimensional (2D) vector graphics triangulation system, comprising:
    a memory module configured for storing a triangle mesh generated by performing a triangulation processing to a 2D vector graphics, wherein the triangle mesh is stored into a binary tree data structure;
    a triangle mesh processing module, coupled to the memory module configured for adjusting the triangle mesh or re-performing the triangulation processing to a local region of the loop when a state of a loop of the 2D vector graphics is changed, wherein the triangle mesh processing module comprises:
        a level of detail unit configured for proportionally adjusting an error threshold according to a zoom condition when a loop of the 2D vector graphic is deformed, updating an error value of each of a plurality of boundary lines of a loop when the loop of the 2D vector graphics has a deformation condition, or splitting a boundary line or merging two neighbouring boundary lines according to a comparison result of the error values of the boundary lines and the error threshold; and
    a 2D vector graphics converting module coupled to the memory module for receiving an input of the 2D vector graphics, and storing a plurality of curve control point coordinate values of the 2D vector graphics into the binary tree data structure, wherein,
    the 2D vector graphics converting module further performs a segmentation processing to the 2D vector graphics to generate one loop or a plurality of loops, and stores data of each loop into the binary tree data structure,
    the 2D vector graphics converting module further converts each loop of the 2D vector graphics into one triangle mesh or a plurality of triangle meshes through the triangulation processing, and stores data of the triangle mesh or the triangle meshes into the binary tree data structure, and
    when a loop of the 2D vector graphics has the zoom condition, the level of detail unit does not update a geometric structure characteristic value of each boundary line, and if the zoom condition corresponds to an enlargement, the level of detail unit proportionally enlarges an error threshold corresponding to each of the boundary lines, and if the zoom condition corresponds to a reduction, the level of detail unit proportionally reduces the error threshold corresponding to each of the boundary lines.

2. The 2D vector graphics triangulation system as claimed in claim 1, wherein the triangle mesh processing module comprises:
    a loop update unit configured for inspecting all of intersections of a path structure comprising a loop of the 2D vector graphics has the deformation condition and updating the binary tree data structure corresponding to the path structure, wherein,
        the loop update unit further detects a folding condition by measuring a direction change of a normal vector of a triangle, wherein the triangle mesh comprises a plurality of triangles, each of the triangle is formed by three neighbouring boundary lines, and a normal vector of each of the triangles is perpendicular to a plane formed by the corresponding triangle,
    after the loop update unit detects the folding condition, the loop update unit determines an influence range of the deformation condition for a loop by inspecting an intersection condition between a folded triangle and a boundary line,
        when the deformation condition causes a self-intersecting state of the path structure, the loop update unit determines whether a loop is generated or disappeared by inspecting a variation of a total number of the intersections of the path structure,
        when the deformation condition causes any two path structures overlapped, the loop update unit obtains a new generated loop by inspecting a plurality of intersections of the overlapped path structures, and updates the binary tree data structures of a plurality of loops of the path structures according to a dependence relationship of every two boundary lines, and
        when the deformation condition causes an internal overlapping of any of the loops, the loop update unit obtains an overlapped loop formed by the internal overlapping of the loop, removes the overlapped loop and updates the binary tree data structure of the loop.

3. The 2D vector graphics triangulation system as claimed in claim 1, wherein,
    when the level of detail unit determines that an error value of a boundary line is greater than or equal to the error threshold, the level of detail unit splits the boundary line into two new boundary lines, and adds data of the two new boundary lines into the binary tree data structure, and
    when the level of detail unit determines that an error value of a common upper-level boundary line of two neighbouring boundary lines is less than the error threshold, the level of detail unit merges the neighbouring boundary lines to form the common upper-level boundary line, and removes data of the merged neighbouring boundary lines from the binary tree data structure.

4. The 2D vector graphics triangulation system as claimed in claim 1, wherein the binary tree data structure comprises:
    a path structure of the 2D vector graphics, comprising input data and a loop list, wherein the input data comprises a plurality of geometric structure characteristic values of the path structure, and the loop list comprises a plurality of loop structures forming the path structure, wherein each of the loop structures comprises:
        a corresponding triangle mesh, comprising a plurality of vertices forming the triangle mesh of the 2D vector graphics and a plurality of connection relationships between the vertices; and
        a boundary line group, comprising a plurality of boundary line structures.

5. The 2D vector graphics triangulation system as claimed in claim 4, wherein each of the boundary line structures comprises:
- an error value, wherein the error value is an error between the boundary line and the loop;
- a plurality of geometric structure characteristic values of a current boundary line; and
- a pointer, pointed to an upper-level boundary line.

6. The 2D vector graphics triangulation system as claimed in claim 5, wherein,
- each of the geometric structure characteristic values of the path structure comprises a start control point coordinate value, an end control point coordinate value and a middle control point coordinate value of one of a plurality of curves for forming the path structure, and
- each of the geometric structure characteristic values of the current boundary line comprises a start control point coordinate value, an end control point coordinate value and a middle control point coordinate value of a curve for forming the boundary line.

7. The 2D vector graphics triangulation system as claimed in claim 5, wherein
- each of the geometric structure characteristic values of the path structure comprises a short axis length, a long axis length, a start angle, an end angle and a rotation angle of one of a plurality of arcs for forming the path structure, and
- each of the geometric structure characteristic values of the current boundary line comprises a start angle, an end angle and a rotation angle of an arc for forming the boundary line.

8. The 2D vector graphics triangulation system as claimed in claim 5, wherein
- each of the geometric structure characteristic values of the path structure comprises two control point coordinate values of one of a plurality of straight lines for forming the path structure, and
- each of the geometric structure characteristic values of the current boundary line comprises two control point coordinate values a straight line for forming the boundary line.

9. The 2D vector graphics triangulation system as claimed in claim 1, wherein the triangle mesh processing module further comprises a triangle mesh update unit configured for re-performing the triangulation processing to a local region of a new loop when the new loop is presented in an image of the 2D vector graphics, so as to establish a new triangle mesh and update the binary tree data structure, wherein
- when a state of a loop of the 2D vector graphics is changed, the triangle mesh update unit updates the loop, and updates the triangle mesh corresponding to the updated loop, and
- the triangle mesh update unit splits two intersected boundary lines into four boundary lines, adds a new intersection, merges two other originally separated neighbouring boundary lines, removes an old intersection, adjusts a plurality of vertices and the connection relationship between the vertices that are influenced during a process of adding the new intersection and removing the old intersection, and updates the binary tree data structure of the loop.

10. A 2D vector graphics triangulation method, comprising:
- using a binary tree data structure to store one triangle mesh or a plurality of triangle meshes generated by performing a triangulation processing to a 2D vector graphics;
- proportionally adjusting an error threshold according to a zoom condition when a loop of the 2D vector graphics is deformed;
- updating an error value of each of a plurality of boundary lines of a loop when the loop of the 2D vector graphics has a deformation condition;
- splitting a boundary line or merging two neighbouring boundary lines according to a comparison result of the error value and the error threshold;
- adjusting the triangle mesh of a loop, or re-performing the triangulation processing to a local region of the loop when a state of the loop of the 2D vector graphics is changed;
- keeping a geometric structure characteristic value of each boundary line not updated when a loop of the 2D vector graphics has the zoom condition, proportionally enlarging an error threshold corresponding to each of the boundary lines if the zoom condition corresponds to an enlargement, and proportionally reducing the error threshold corresponding to each of the boundary lines if the zoom condition corresponds to a reduction, wherein
- the step of splitting the boundary line or merging the two neighbouring boundary lines according to the comparison result of the error value and the error threshold comprises:
  - splitting a boundary line into two new boundary lines, and adding data of the two new boundary lines into the binary tree data structure when an error value of the boundary line is greater than or equal to the error threshold; and
- merging two neighbouring boundary lines into a common upper-level boundary line, and removing data of the two boundary lines from the binary tree data structure when an error value of the common upper-level boundary line of the two neighbouring boundary lines is less than the error threshold.

11. The 2D vector graphics triangulation method as claimed in claim 10, further comprising:
- receiving an input of the 2D vector graphics, and storing a plurality of curve control point coordinate values of the 2D vector graphics into the binary tree data structure;
- performing a segmentation processing to the 2D vector graphics to generate one loop or a plurality of loops, and storing data of each loop into the binary tree data structure;
- converting each loop of the 2D vector graphics into one triangle mesh or a plurality of triangle meshes through the triangulation processing, and storing data of the triangle mesh or the triangle meshes into the binary tree data structure; and
- drawing the triangle mesh according to the binary tree data structure.

12. The 2D vector graphics triangulation method as claimed in claim 11, wherein the binary tree data structure comprises:
- a path structure of the 2D vector graphics, comprising input data and a loop list, wherein the input data comprises a plurality of geometric structure characteristic values of the path structure, and the loop list comprises a plurality of loop structures forming the path structure, wherein each of the loop structures comprises:
  - a corresponding triangle mesh, comprising a plurality of vertices forming the triangle mesh of the 2D vector graphics and a plurality of connection relationships between the vertices; and
  - a boundary line group, comprising a plurality of boundary line structures.

13. The 2D vector graphics triangulation method as claimed in claim 12, wherein each of the boundary line structures comprises:
- an error value, wherein the error value is an error between the boundary line and the loop;
- a plurality of geometric structure characteristic values of a current boundary line; and
- a pointer, pointed to an upper-level boundary line.

14. The 2D vector graphics triangulation method as claimed in claim 13, wherein
- each of the geometric structure characteristic values of the path structure comprises a start control point coordinate value, an end control point coordinate value and a middle control point coordinate value of one of a plurality of curves for forming the path structure, and
- each of the geometric structure characteristic values of the current boundary line comprises a start control point coordinate value, an end control point coordinate value and a middle control point coordinate value of a curve for forming the boundary line.

15. The 2D vector graphics triangulation method as claimed in claim 13, wherein
- each of the geometric structure characteristic values of the path structure comprises a short axis length, a long axis length, a start angle, an end angle and a rotation angle of one of a plurality of arcs for forming the path structure, and
- each of the geometric structure characteristic values of the current boundary line comprises a start angle, an end angle and a rotation angle of an arc for forming the boundary line.

16. The 2D vector graphics triangulation method as claimed in claim 13, wherein
- each of the geometric structure characteristic values of the path structure comprises two control point coordinate values of one of a plurality of straight lines for forming the path structure, and
- each of the geometric structure characteristic values of the current boundary line comprises two control point coordinate values of a straight line for forming the boundary line.

17. The 2D vector graphics triangulation method as claimed in claim 10, further comprising:
- inspecting all of intersections of the path structure and updating the binary tree data structure corresponding to the path structure when a loop of the 2D vector graphics has the deformation condition;
- detecting a folding condition by measuring a direction change of a normal vector of a triangle, wherein the triangle mesh comprises a plurality of triangles, each of the triangle is formed by three neighbouring boundary lines, and a normal vector of each of the triangles is perpendicular to a plane formed by the corresponding triangle;
- determining an influence range of the deformation condition for a loop by inspecting an intersection condition between a folded triangle and a boundary line after the folding condition is detected;
- determining whether a loop is generated or disappeared by inspecting a variation of a total number of the intersections of the path structure when the deformation condition causes a self-intersecting state of the path structure;
- obtaining a new generated loop by inspecting a plurality of intersections of an overlapping, and updating the binary tree data structures of a plurality of loops of the path structures according to a dependence relationship of every two boundary lines when the deformation condition causes any two path structures overlapped; and
- obtaining an overlapped loop formed by an internal overlapping of a loop, and removing the overlapped loop and updating the binary tree data structure of the loop when the deformation condition causes the internal overlapping of any of the loops.

18. The 2D vector graphics triangulation method as claimed in claim 10, wherein,
- when there is a new loop presented in an image of the 2D vector graphics, the triangulation processing is re-performed to a local region of the new loop to establish a new triangle mesh, and the binary tree data structure is updated; and
- when a state of a loop of the 2D vector graphics is changed, the step of adjusting the triangle mesh of the loop comprises:
  - updating the loop;
  - updating the triangle mesh corresponding to the updated loop;
  - splitting intersected two boundary lines into four boundary lines, and adding a new intersection;
  - merging two other originally separated neighbouring boundary lines, and removing an old intersection;
  - adjusting a plurality of vertices and the connection relationship between the vertices that are influenced during a process of adding the new intersection and removing the old intersection; and
  - updating the binary tree data structure of the loop.

* * * * *